US006805156B2

United States Patent
Sasao

(10) Patent No.: US 6,805,156 B2
(45) Date of Patent: Oct. 19, 2004

(54) CONSTANT FLOW VALVE AND CONSTANT FLOW MIXING METHOD

(75) Inventor: Kimihito Sasao, Nagoya (JP)

(73) Assignee: Advance Denki Kougyou Kabushiki Kaisha, Aichi (JP)

( * ) Notice: Subject to any disclaimer, the term of this patent is extended or adjusted under 35 U.S.C. 154(b) by 162 days.

(21) Appl. No.: 10/286,749

(22) Filed: Nov. 4, 2002

(65) Prior Publication Data

US 2003/0116196 A1 Jun. 26, 2003

(30) Foreign Application Priority Data

Dec. 20, 2001 (JP) .................................... 2001-388251
Jun. 27, 2002 (JP) .................................... 2002-187551

(51) Int. Cl.[7] .............................................. G05D 7/03
(52) U.S. Cl. ...................................................... 137/501
(58) Field of Search ........................... 137/501, 505.14, 137/7, 606

(56) References Cited

U.S. PATENT DOCUMENTS

| 2,867,268 A | * | 1/1959 | Brown | 137/501 |
| 3,172,254 A | * | 3/1965 | Wright | 137/501 |
| 3,621,866 A | * | 11/1971 | Thorsheim | 137/501 |
| 4,776,367 A | * | 10/1988 | Hilmersson et al. | 137/501 |
| 5,329,966 A |   | 7/1994 | Fenimore et al. | |
| 5,983,926 A | * | 11/1999 | Mastuzawa | 137/501 |

FOREIGN PATENT DOCUMENTS

| EP | 1 014 244 A1 | 6/2000 |
| JP | 06-123371 | 5/1994 |

OTHER PUBLICATIONS

European Search Report dated Mar. 25, 2003.

* cited by examiner

Primary Examiner—Stephen M. Hepperle
(74) Attorney, Agent, or Firm—Rader, Fishman & Grauer PLLC

(57) ABSTRACT

A constant flow valve not allowing a controlled fluid to remain standing in it and not contacting the controlled fluid except at diaphragms, enabling simple adjustment of differential pressure, and good in response, including a valve body, a valve action chamber and connecting channel formed at the valve body, a valve mechanism attached to the valve action chamber, and a restrictor provided at the connecting channel, wherein the valve action chamber is formed with a primary side fluid inlet port, valve seat, outlet port to the connecting channel, inlet port from the connecting channel, and secondary side fluid outlet port and wherein the valve mechanism is provided with a first diaphragm, a second diaphragm, and a third diaphragm moving together with a valve element, and a constant flow mixing method for effectively mixing a plurality of fluids using such constant flow valves.

7 Claims, 6 Drawing Sheets

US 6,805,156 B2

CONSTANT FLOW VALVE AND CONSTANT FLOW MIXING METHOD

BACKGROUND OF THE INVENTION

1. Field of the Invention

The present invention relates to a constant flow valve and a constant flow mixing method for mixing a plurality of fluids using the constant flow valves.

2. Description of the Related Art

In the past, as a constant flow valve used for supply of a fluid at a constant flow, broad use has been made of ones which lead part of a secondary pressure side fluid into a control chamber having a valve member and use this as pilot pressure for making the flow of supply constant. In this constant flow valve, however, the fluid remains stagnant in the pipe laid for the pilot pressure (pilot pipe) and becomes so-called "dead water". This breeds bacteria which sometimes flows into the main flow. To solve this problem, for example, a constant flow valve of a full flow replacement type not using a pilot pipe has been proposed as described in Japanese Unexamined Patent Publication (Kokai) No. 6-123371.

The constant flow valve 90 shown in FIG. 6 relates to the structure disclosed in the above publication. A chamber 100 is divided by a pressure receiving member 120 biased by a spring member 121 into a primary side (lower half) chamber 101 and a secondary side (upper half) chamber 102. A controlled fluid flows in from an inlet port 103 of the primary side chamber 101 and flows out from an outlet port 104 of the primary side chamber 101, passes through a connecting pipe 130 provided with a flow regulating valve 131, flows from an inlet port 105 of the secondary side chamber 102 into the secondary side chamber 102, and flows out from an outlet port 106. In the primary side chamber 101, a valve chamber 110 is provided. A valve member 112 biased by a spring member 113 adjusts the opening degree of a valve seat 111 in accordance with the amount of action of the pressure receiving member 120. Reference numeral 115 is a through hole formed in the valve member 112.

According to this constant flow valve 90, as will be understood from the different states of the left and right in the figure, when the pressure of the primary side or secondary side changes, the pressure receiving member 120 actuates due to the differential pressure of the primary side fluid and secondary side fluid as a whole. In accordance with that amount of action, the valve member 112 of the valve chamber 110 of the primary side fluid moves, whereby the flow rate of the primary fluid is adjusted to a predetermined rate by the adjustment of the opening degree of the valve seat 111. Since no pilot pipe is used, fluid does not remain stagnant and no dead water is produced as explained above.

In this constant flow valve 90, as illustrated, spring members 121 and 113 are provided for biasing the pressure receiving member 120 and valve member 112. The fluid contacts the spring members 121 and 113, so when the fluid has metal corrosiveness or is an organic solvent, electrolyte, gas, etc., the springs 121 and 113 are liable to be corroded or contaminated by impurities. The valve cannot be used in lines not permitting chemicals and other impurities.

Further, in this constant flow valve 90, since the spring members 121 and 113 are built into the portion contacting the fluid inside the device, there is the structural problem that the differential pressure cannot be changed from the outside. Further, this configuration does not consider the pressure receiving member 120 or the pressure receiving area of the valve member 113, so complete maintenance of a constant differential pressure is difficult. The problem has been pointed out that when the resistance due to the restrictor is large, the flow rate is controlled relatively accurately, but when the resistance is small and the differential pressure is low, the valve cannot function effectively for fluctuations in pressure at the primary side and secondary side.

BRIEF DESCRIPTION OF THE DRAWINGS

These and other objects and features of the present invention will become clearer from the following description of the preferred embodiments given with reference to the attached drawings, wherein.

SUMMARY OF THE INVENTION

Figure 1:
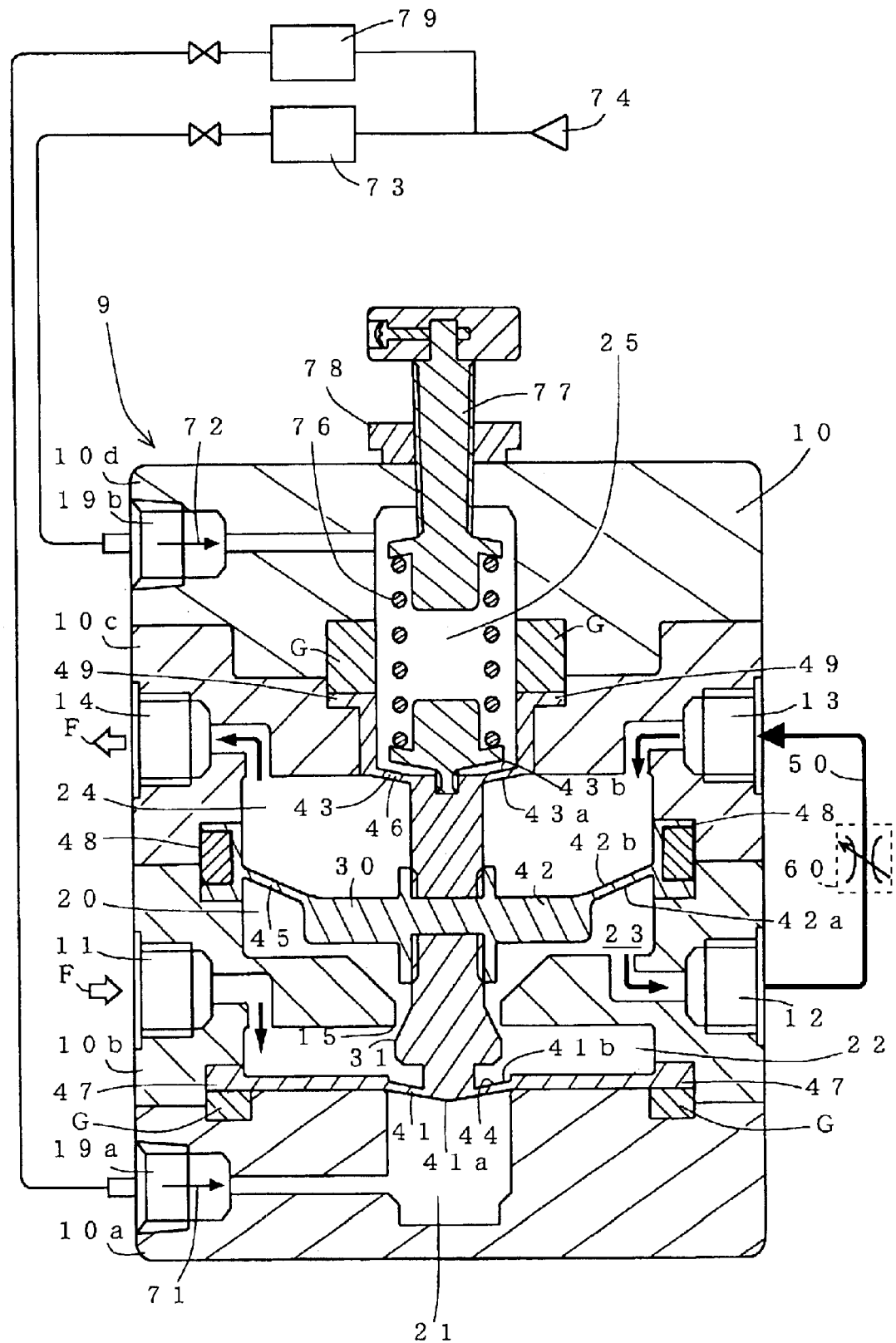
FIG. 1 is a central longitudinal sectional view of a constant flow valve according to an embodiment of the invention of claim 1.

An object of the present invention is to provide a constant flow valve which does not allow the controlled fluid to remain stagnant and does not contact the controlled fluid except at the diaphragms, enables easy adjustment of the differential pressure, and has a good response.

Another object of the present invention is to provide a constant flow mixing method for effectively mixing a plurality of fluids using the constant flow valves.

According to a first aspect of the present invention, there is provided a constant flow valve comprised of a valve body, a valve action chamber and connecting channel formed at the valve body, a valve mechanism attached in the valve action chamber, and a restrictor provided in the connecting channel, wherein the valve action chamber is formed with a primary side fluid inlet port, a valve seat, an outlet port to the connecting channel, an inlet port from the connecting channel, and an outlet port of a secondary side fluid; the valve mechanism is provided with a first diaphragm, a second diaphragm, and a third diaphragm moving together with a valve element, the first diaphragm has an effective pressure receiving area substantially equal to a valve seat upstream side pressure receiving face of the valve element, is attached inside the valve action chamber, and has one surface defining part of an air pressure chamber and another surface defining part of a first chamber having the primary side fluid inlet port and valve seat upstream part; the second diaphragm is attached in the valve action chamber and has one surface defining a second chamber having an outlet port to the connecting channel and valve seat downstream portion and another surface defining a third chamber having an inlet port from the connecting channel and a secondary side fluid outlet port; the third diaphragm has an effective pressure receiving area substantially equal to a valve seat downstream side pressure receiving face of the valve element, is attached inside the valve action chamber, and has one surface defining part of the third chamber and another surface defining part of a pressurizing chamber; the valve element advances and retracts with respect to the valve seat together with movement of the valve mechanism; and the pressurizing chamber is provided with a pressurizing means for pressing the valve mechanism by a predetermined pressure.

Preferably, the pressurizing means is pressurized air and a spring member is attached as an auxiliary pressurizing means in the pressurizing chamber.

More preferably, a pressurizing means is provided in the air pressure chamber.

Still more preferably, the restrictor is comprised of a variable orifice.

According to a second aspect of the invention, there is provided a constant flow mixing method using a first constant flow valve and second constant flow valve of any of the above into which different fluids flow and combining a channel from a secondary side fluid outlet port of the second constant flow valve at a restrictor upstream side of the first constant flow valve for mixing.

DESCRIPTION OF THE PREFERRED EMBODIMENTS

The present invention will be explained in detail below with reference to the attached drawings.

Figure 2:
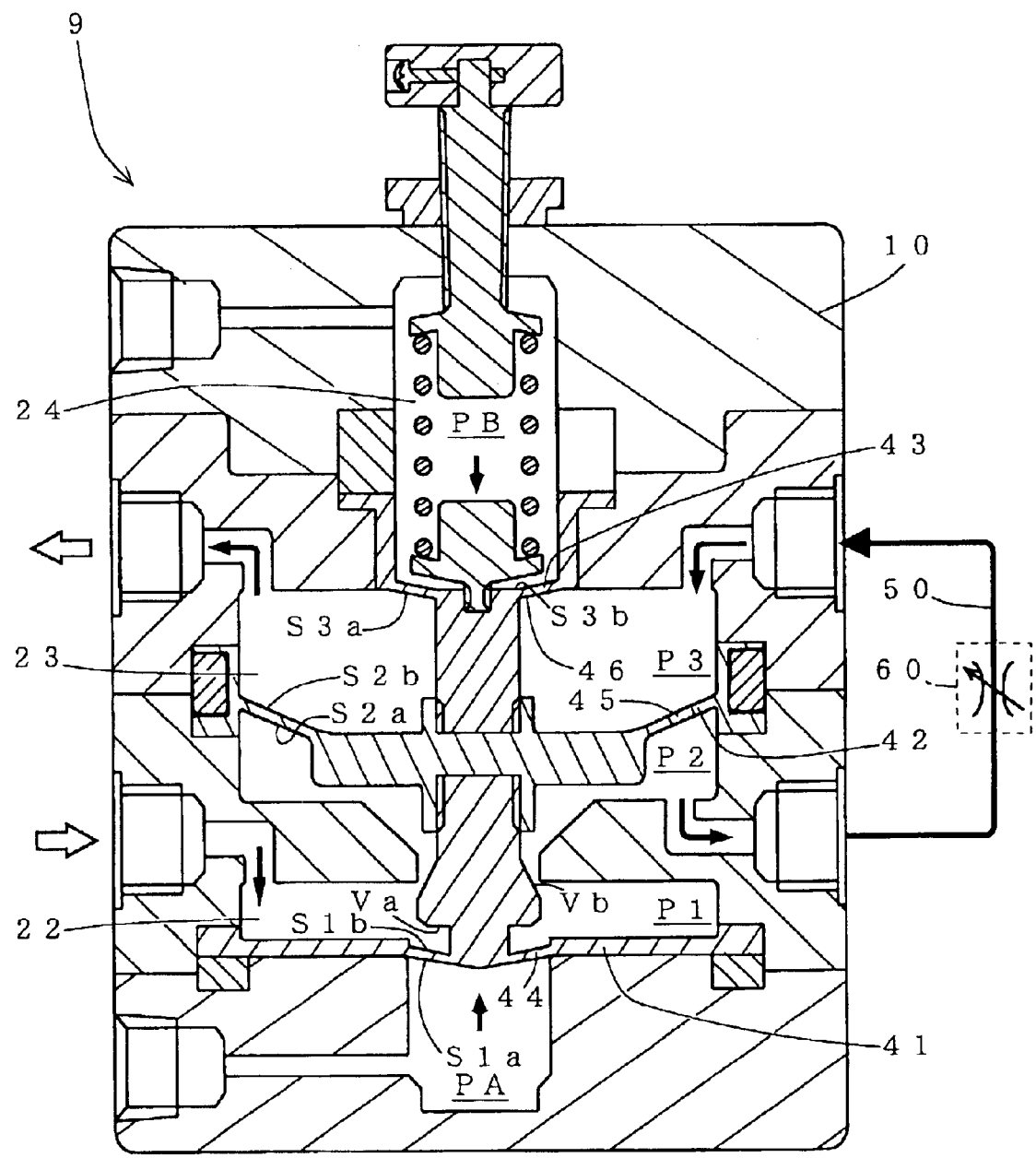
FIG. 2 is a sectional view expressing the relationship between pressures of chambers and pressure receiving areas of diaphragms in the constant flow valve shown in FIG. 1.
Figure 3:
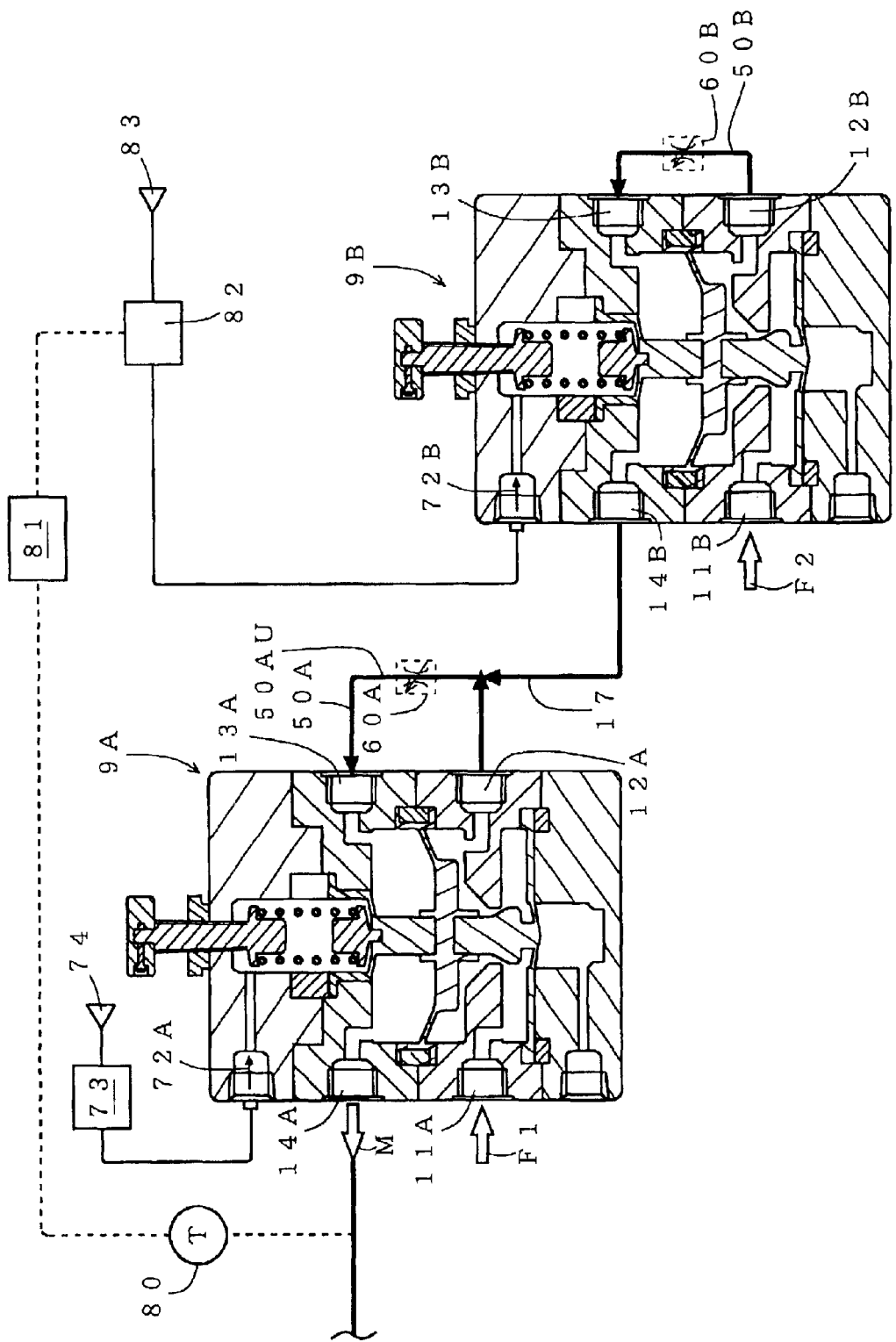
FIG. 3 is a view of the layout of a constant flow valve showing an example of a constant flow mixing method according to the invention of claim 5.
Figure 4:
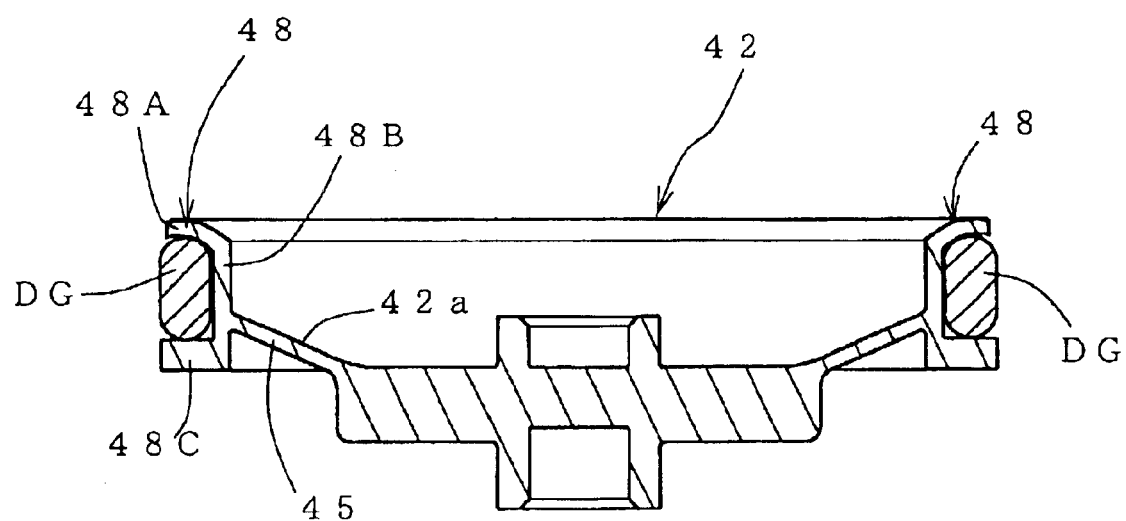
FIG. 4 is a sectional view showing enlarged one embodiment of the diaphragm of the constant flow valve.
Figure 5:
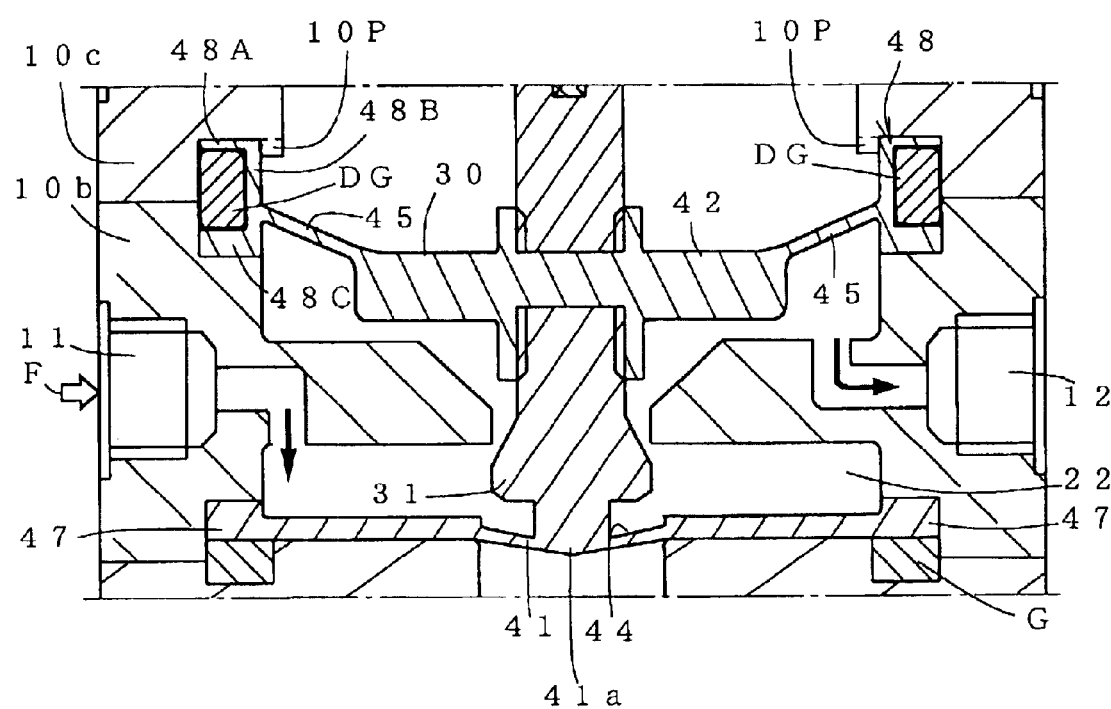
FIG. 5 is a partial sectional view showing enlarged the state of attachment of a diaphragm to a constant flow valve.
Figure 6:
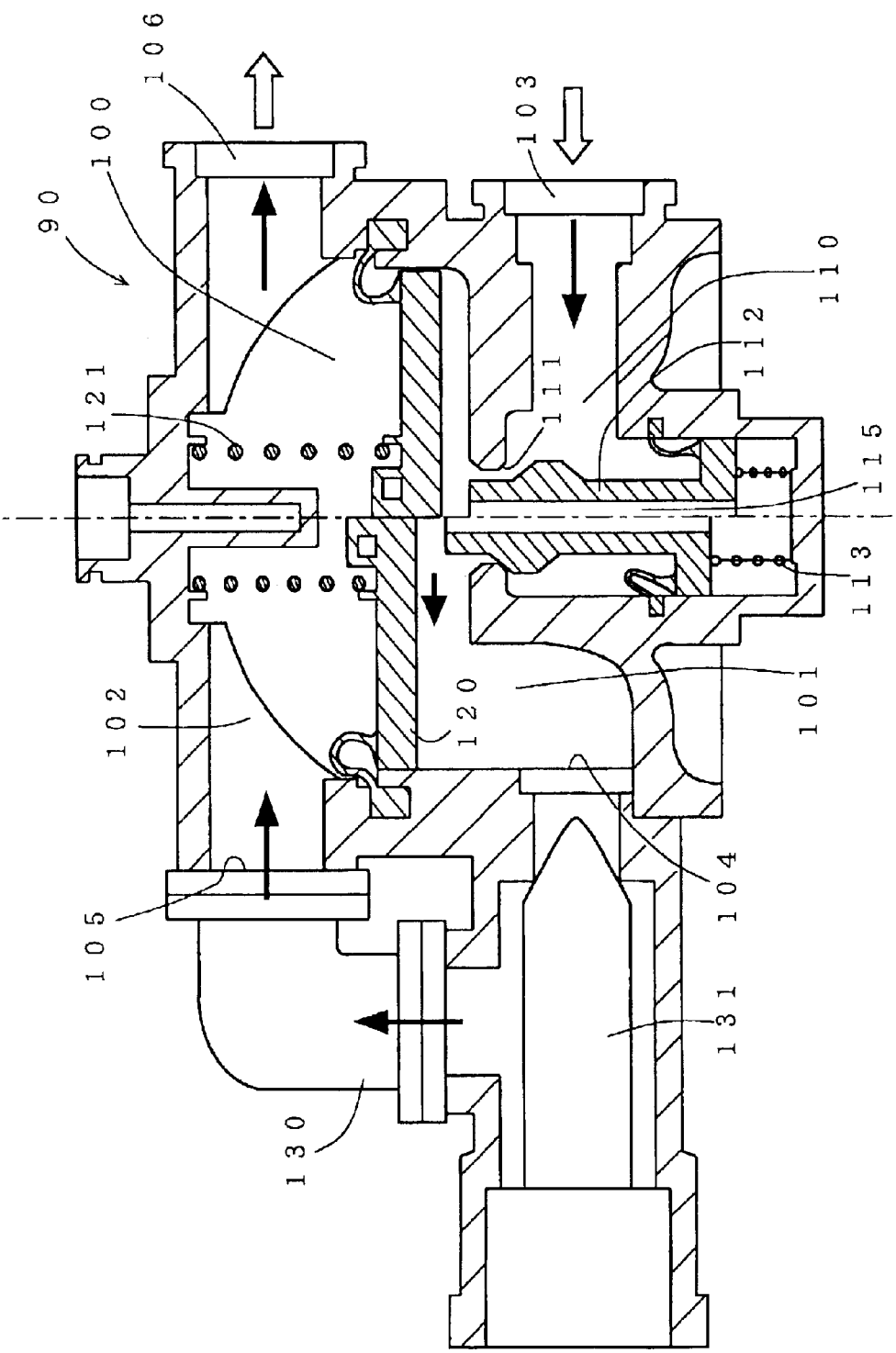
FIG. 6 is a central longitudinal sectional view showing an example of a conventional constant flow valve.

FIG. 1 is a central longitudinal sectional view of a constant flow valve according to an embodiment of the invention of claim 1, FIG. 2 is a sectional view expressing the relationship between pressures of chambers and pressure receiving areas of diaphragms in the constant flow valve shown in FIG. 1, FIG. 3 is a view of the layout of a constant flow valve showing an example of the constant flow mixing method according to the invention of claim 5, FIG. 4 is a sectional view showing enlarged one embodiment of a diaphragm of the constant flow valve, and FIG. 5 is a partial sectional view showing enlarged the state of attachment of a diaphragm to the constant flow valve.

The constant flow valve 9 shown in FIG. 1 is used for various fluids such as pure water, chemicals, corrosive fluids, organic solvents, electrolytes, and gases and controls the outflow of the controlled fluid to a predetermined flow rate by the pressure difference of the primary side and secondary side fluids. The constant flow valve 9 is comprised of a valve body 10, a valve action chamber 20 formed in the valve body 10, a connecting channel 50, a valve mechanism 30 attached to the valve action chamber 20, and a restrictor 60 provided in the connecting channel 50.

The valve body 10 is formed from a fluorine-based plastic or other plastic having a high corrosion resistance and chemical resistance and is formed internally with the valve action chamber 20. The valve action chamber 20 is formed with a primary side fluid inlet port 11 of a controlled fluid F, a valve seat 15, an outlet port 12 to a connecting channel 50, an inlet port 13 from the connecting channel 50, and a secondary side fluid outlet port 14.

The primary side fluid inlet port 11 and secondary side fluid outlet port 14 are channel connection ports for the inflow and outflow of the controlled fluid. Suitable pipes are connected to these inlet port 11 and outlet port 14. Further, the outlet port 12 to the connecting channel 50 and inlet port 13 from the connecting channel 50 are connection ports to the connecting channel 50 provided with a restrictor 60 for adjusting the differential pressure between the primary side fluid and the secondary side fluid. The valve seat 15 is formed projecting out to the inside of the valve action chamber 20 and is provided with the later explained valve mechanism 30.

The valve action chamber 20 has a valve mechanism 30 arranged inside it. The valve mechanism 30, in the same way as the valve body 10, is formed from a fluorine-based plastic or other plastic having a high corrosion resistance and chemical resistance and is provided with a valve element 31 and a first diaphragm 41, a second diaphragm 42, and a third diaphragm 43 moving together with the valve element 31.

The first diaphragm 41, second diaphragm 42, and third diaphragm 43 provided in the valve mechanism 30 are comprised of diaphragm surfaces 44, 45, and 46 comprised of thin films as moving parts and outside rim peripheral seals 47, 48, and 49. These first, second, and third diaphragms 41, 42, and 43 are affixed by the peripheral seals 47, 48, and 49 being clamped inside the valve body 10. The valve body 10 in this example is designed to easily clamp and affix the peripheral seals of the diaphragms 41, 42, and 43 by being divided into a first valve body part 10a, a second valve body part 10b, a third valve body part 10c, and a fourth valve body part 10d.

The peripheral seals 47 and 49 of the first diaphragm 41 and third diaphragm 43 are provided at their outsides with rubber cushions G as buffer members to be clamped and affixed to the valve body 10. As opposed to this, the second diaphragm 42 contacts the fluid at its two surfaces, so degradation of the buffer material is a concern. In particular, when the fluid is ozone water or a gas, it easily passes through the fluorine-based plastic of the diaphragms to degrade the buffer member. Therefore, for the peripheral seal 48 of the second diaphragm 42, as illustrated, it is recommended to form the peripheral seal 48 into a U-sectional shape opening to the outside, make the portion contacting the fluid at the inside thick, and press-fit a cushion material DG inside it.

In the embodiments of FIG. 4 and FIG. 5, a structure is shown where one of the top or bottom side in the peripheral seal 48 having the U-sectional shape of the second diaphragm 42 (here, the top piece 48A) is made thin to enable deformation for attachment, the remaining two sides (here, the standing piece 48B and bottom piece 48C) are made thick to increase the barrier performance and deformation resistance, and a cushion member DG is press fit inside. FIG. 4 shows the state before the attachment of the second diaphragm 42 and cushion member DG in the valve body. In this example, the thickness of the top piece 48A of the peripheral seal 48 was made 0.5 mm, while the thicknesses of the standing piece 48B and bottom piece 48C were made 1 mm (or more). As the cushion member DG, a fluororubber or nitrile rubber or EPDM, silicone, etc. is preferably used. Note that in the figures, the same members are explained assigned the same reference numerals.

By using such a structure, as shown in FIG. 5, when attaching the second diaphragm 42 to the valve body 10, the cushion member DG can be protected from permeation of the fluid and prevented from degradation by the standing piece 48B and bottom piece 48C comprised of the thick parts of the peripheral seal 48 of the diaphragm 42. At the same time, the standing piece 48B and bottom piece 48C comprised of the thick parts can suppress rebound of the compressed cushion member DG to the diaphragm rear direction and prevent deformation of the diaphragm surface 45.

Still further, as shown in FIG. 4, by forming the protective projecting wall 10P at the inside of the top piece 48A comprised of the thin part of the peripheral seal 48 at the valve body 10c to which the peripheral seal 48 is attached, it is possible to also improve the barrier performance and deformation resistance of the top piece 48A.

The first diaphragm 41 has an effective pressure receiving area S1b (see FIG. 2) substantially equal to the upstream side pressure receiving surface Va (see FIG. 2) of the valve seat 15 of the valve element 30. Here, "the effective pressure receiving area" of the diaphragm is the area by which the diaphragm surface 44 comprised of the thin film serving as the moving piece effectively receives pressure and is the area of the intermediate part of the outside radius (r1) and inside radius (r2) of the diaphragm surface comprised of the thin film (r3=(r1−r2)/2) minus the area of the inside radius (r2), that is, is calculated as $\pi(r3)^2 - \pi(r2)^2$. Note that the same applies in the following explanation.

Further, the first diaphragm 41 is attached to the inside of the valve action chamber 20. One surface 41a defines part of the air pressure chamber 21, while the other surface 41b defines part of the first chamber 22 having the inlet port 11 of the primary side fluid and the upstream part of the valve seat 15.

Further, the second diaphragm 42 is attached to the inside of the valve action chamber 20. One surface 42a defines part of the second chamber 23 having the outlet port 12 to the connecting channel 50 and downstream part of the valve seat 15, while the other surface 42b defines part of the third chamber 24 having the inlet port 13 from the connecting channel 50 and the outlet port 14 of the secondary side fluid.

Further, the third diaphragm 43 has an effective pressure receiving area S3a (see FIG. 2) substantially equal to the downstream side pressure receiving surface Vb (see FIG. 2) of the valve seat 15 of the valve element 31. Note that the same applies to the effective pressure receiving surface as explained above. Further, the third diaphragm 43 is attached inside the valve action chamber 20. One surface 43a defines part of the third chamber 24, while the other surface 43b defines part of the pressurizing chamber 25.

The valve element 31 of the valve mechanism 30 advances and retracts with respect to the valve seat 15 along with movement of the valve mechanism 30 to change the opening degree and change the flow of the controlled fluid from the first chamber 22 to the second chamber 23.

The pressurizing chamber 25 is provided with a pressurizing means 72 for pressing the valve mechanism 30 by a predetermined pressure. The pressurizing means 72 is comprised of pressurized air or a spring etc. and is preferably comprised to be adjustable from the outside of the valve body 10. In this embodiment, as defined in the invention of claim 2, the pressurizing means 72 is pressurized air and a spring member 76 is attached as auxiliary pressurizing means in the pressurizing chamber 25. In FIG. 1, reference numeral 19b indicates an inlet port of pressurized air, 73 a regulator for adjusting the air pressure (pressure reduction valve), and 74 an air source. The spring member (coil spring) 76 is designed so that the pressing force of the spring member 76 is adjusted by the advance and retraction of the pressing member 77 screwed into the valve body 10. Reference numeral 78 indicates a lock screw. This spring member 76 assists the pressing force of the pressurized air of the pressurizing means 72 and enables a so-called "slow leak" for preventing problems such as the occurrence of bacteria caused by the circulation of the fluid F being completely stopped when the supply of pressurizing air is stopped (including times of emergencies).

The air pressurizing chamber 21 is normally at atmospheric pressure, but pressurized air may be sent into it in accordance with need. Reference numeral 19a is the air inlet port/outlet port. Further, as defined and illustrated as the invention of claim 3, when providing the air pressurizing chamber 21 with pressurized air or another pressurizing means 71 and for example forcibly stopping the supply of the controlled fluid, it is possible to make the valve mechanism 30 advance and bring the valve element 31 into contact with the valve seat 15 to close the valve. At this time, reference numeral 19a becomes the inlet port of the pressurized air. Reference numeral 79 indicates a regulator for adjusting the air pressure (pressure reduction valve) and uses an air source 74 common with the pressurizing means 72.

Explaining the connecting channel 50, the channel 50 may be provided in the valve body 10. Depending on the piping etc., it may also be provided at the outside. This is determined by the convenience of piping of the restrictor 60 explained later.

The restrictor 60 provided in the connecting channel 50 provides a difference in the pressure P1 of the primary side fluid and pressure P2 of the secondary side fluid. A known throttle valve etc. may be used. Further, as defined in the invention of claims 4, 5 and 6, the restrictor 60 is effectively and economically comprised of a variable orifice. In this example, a linear type variable orifice (throttle valve) is used.

Next, the operation of the constant flow valve 9 of the present invention will be explained. As shown in FIG. 2, the pressure of the air pressure chamber is designated as PA, the pressure of the first chamber as P1, the pressure of the second chamber as P2, the pressure of the third chamber as P3, and the pressure of the pressurizing chamber as PB. Further, the effective pressure receiving area of the bottom surface of the first diaphragm surface 44 of the first diaphragm 41 of the valve mechanism 30 is designated as S1a, the effective pressure receiving area of the top surface as S1b, the valve seat upstream side pressure receiving surface of the valve element 31 as Va, the valve seat downstream side pressure receiving surface as Vb, the effective pressure receiving area of the bottom surface of the second diaphragm surface 45 of the second diaphragm 42 as S2a, the effective pressure receiving area of the top surface as S2b, the effective pressure receiving area of the bottom surface of the third diaphragm 46 of the third diaphragm as S3a, and the effective pressure receiving area of the top surface as S3b. Expressing the relationship between the pressures of the chambers and the pressures received at the parts of the valve mechanism in balance as a numerical equation, the following is obtained.

$$PB \cdot S3b + P3 \cdot S2b + P2 \cdot Vb + P1 \cdot S1b = PA \cdot S1a + P1 \cdot Va + P2 \cdot S2a + P3 \cdot S3a \quad \text{(Equation 1)}$$

Equation 1 shows the pressure to the bottom direction at the left side and the pressure to the top direction at the right side, so the pressures of the bottom direction and top direction match and therefore the two sides are connected by an equal sign. Here, in the present invention, since the effective pressure receiving areas S1b and S3a of the first 41 and third diaphragm 43 and the pressure receiving surfaces Va and Vb of the valve element 31 are in the above relationship, the conditions of the following equations 2 can be derived. Note that the pressurizing force PA of the chamber 21 is extremely small and is therefore ignored.

$$S1b = Va$$
$$S3b = Vb$$
$$S2a = S2b \text{ (back and front relationship)} \quad \text{(equations 2)}$$

$$PB \cdot S3b + P3 \cdot S2b + P2 \cdot Vb + P1 \cdot S1b = P1 \cdot Va + P2 \cdot S2a + P3 \cdot S3a \quad \text{(equations 3)}$$

Here, the condition of equations 2 are entered to make PA zero.

$$PB \cdot S3b = P2(S2a - Vb) + P3(Vb - S2a)$$

$$\therefore PB = [(S2a - Vb)/S3b] \cdot (P2 - P3)$$

$$= [(S2b - Vb)/Vb] \cdot \Delta P$$

The conditions shown in equations 2 can be derived from the configuration of the constant flow valve 9 of claim 1 of the present invention as explained above and can be summarized as shown in equation 3. From equation 3, it is learned that the pressurizing force PB of the pressurizing means 72 in the pressurizing chamber 25 is proportional to the pressure difference of the restrictor 60, that is, the differential pressure $\Delta P$. Therefore, if the pressurizing force PB of the pressurizing means 72 is changed along with the differential pressure $\Delta P$, it is possible to simply control the flow rate of supply.

Next, the constant flow mixing method of mixing different fluids using the constant flow valves 9 of the present invention will be explained. FIG. 3 shows a preferable embodiment of the constant flow mixing method according to the invention of claim 7.

When desiring to supply a predetermined amount of a mixed fluid M, for example, when mixing cold water F1 and hot water F2 to mix a predetermined amount of warm water M, first cold water F1 is introduced into the first constant flow valve 9A from the primary side fluid inlet port 11A and made to flow out from the outlet port 12A to the connecting channel 50A. On the other hand, hot water F2 is introduced into the second constant flow valve 9B from the primary side fluid inlet port 11B, passes through the connecting channel 50B having the restrictor 60B, is made to flow out from the secondary side outlet port 14B, and is merged and mixed with the cold water F1 at the restrictor upstream side 50AU of the connecting channel 50A of the first constant flow valve 9A. Further, the mixed warm water M passes through the restrictor 60A of the first constant flow valve and the inlet port 13A from the connecting channel to the secondary side fluid outlet port 14A.

By mixing fluids in this way, the flow of a predetermined amount of cold water F1 is controlled by the first constant flow valve 9A, while the flow of the predetermined amount of mixed water, that is, warm water F2, is controlled by the second constant flow valve 9B. Note that as illustrated, if measuring the temperature of the warm water M flowing out from the outlet port 14A of the secondary side fluid of the first constant flow valve 9A by a measuring device (thermometer) 80 and adjusting the pressurized air of the pressurizing means 72B by an electro pneumatic converter 82 from a controller 81, it is possible to adjust the flow of the hot water F2 mixed with the cold water F1 and control the warm water to one of a predetermined temperature. Reference numeral 83 is an air source of the pressurized air (note that it may be common with the air source 74 of the pressurizing means 72A of the first constant flow valve 9A).

In the above example, the explanation was made of the case of supplying warm water M by mixing cold water F1 and hot water F2, but the invention is not limited to this. It is also possible to mixing a plurality of different fluids such as chemicals. Note that the measuring device 80 used may be a pH meter, densitometer, etc. depending on the state of mixing of the fluid.

Summarizing the effects of the invention, as illustrated and explained above, since no pilot pipe is used in the constant flow valve according to the present invention, the controlled fluid is not allowed to remain stagnant and the occurrence of so-called dead water is eliminated, so there are none of the problems of occurrence of bacteria or entry of impurities etc. Further, since the controlled fluid does not contact anywhere other than the diaphragms, the valve can be effectively used when the fluid has metal corrosiveness or is an organic solvent, electrolyte, gas, etc. or on a line not allowing chemicals or other impurities.

In the constant flow valve of the present invention, since the pressurizing chamber is provided with a pressurizing means and there is no contact with the fluid inside the device, it is easy to change the pressurizing force from the outside. In particular, with the constant flow valve of the present invention, as explained above, since the pressurizing force of the pressurizing means in the pressurizing chamber is designed to be proportional to the pressure difference at the restrictor, that is, the differential pressure, it is possible to simply adjust the differential pressure and possible to completely maintain a constant differential pressure. Even when the resistance is small due to the restrictor and the differential pressure is low, the valve functions effectively and control is possible with a good response. Due to this, control with a large range ability becomes possible.

Further, according to the constant flow mixing method using such constant flow valves, it is possible to efficiently and reliably mix a plurality of types of fluids. In this way, the present invention is useful and preferably used in fluid supply lines in the field of medicine and the field of semiconductors.

What is claimed is:

1. A constant flow valve comprised of a valve body (10), a valve action chamber (20) and connecting channel (50) formed at said valve body, a valve mechanism (30) attached in said valve action chamber, and a restrictor (60) provided in said connecting channel, wherein said valve action chamber (20) is formed with a primary side fluid inlet port (11), a valve seat (15), an outlet port (12) to said connecting channel, an inlet port (13) from said connecting channel, and a secondary side fluid outlet port (14);

said valve mechanism (30) is provided with a first diaphragm (41), a second diaphragm (42), and a third diaphragm (43) moving together with a valve element (31), said first diaphragm (41) has an effective pressure receiving area (S1b) substantially equal to a valve seat upstream side pressure receiving face (Va) of said valve element, is attached inside said valve action chamber, and has one surface (41a) defining part of an air pressure chamber (21) and another surface (41b) defining part of a first chamber (22) having said primary side fluid inlet port and valve seat upstream part;

said second diaphragm (42) is attached in said valve action chamber, and has one surface (42a) defining a second chamber (23) having the outlet port to said connecting channel and valve seat downstream part and another surface (42b) defining a third chamber (24) having the inlet port from said connecting channel and the secondary side fluid outlet port;

said third diaphragm (43) has an effective pressure receiving area (S3a) substantially equal to a valve seat downstream side pressure receiving face (Vb) of said valve element, is attached inside said valve action chamber, and has one surface (43a) defining part of said third chamber and another surface (43b) defining part of a pressurizing chamber (25);

said valve element advances and retracts with respect to said valve seat together with movement of said valve mechanism; and said pressurizing chamber is provided with a pressurizing means (72) for pressing said valve mechanism by a predetermined pressure.

2. A constant flow valve as set forth in claim 1, wherein said pressurizing means (72) is pressurized air and wherein a spring member (76) is attached as an auxiliary pressurizing means in said pressurizing chamber.

3. A constant flow valve as set forth in claim 1 or 2, wherein a pressurizing means (71) is provided in said air pressure chamber (21).

4. A constant flow valve as set forth in claim 1, wherein said restrictor (60) is comprised of a variable orifice.

5. A constant flow valve as set forth in claim 2, wherein said restrictor (60) is comprised of a variable orifice.

6. A constant flow valve as set forth in claim 3, wherein said restrictor (60) is comprised of a variable orifice.

7. A constant flow mixing method using a first constant flow valve (9A) and a second constant flow valve (9B) as set forth in any one of claims 1, 2, 4 and 5 into which different fluids flow and combining a channel (17) from a secondary side fluid outlet port (14B) of said second constant flow valve at a restrictor upstream side (50 AU) of said first constant flow valve from mixing.

\* \* \* \* \*